US011362969B2

(12) United States Patent
Brouer et al.

(10) Patent No.: US 11,362,969 B2
(45) Date of Patent: Jun. 14, 2022

(54) EFFICIENT PACKET RE-TRANSMISSION FOR EXPRESS DATA PATHS

(71) Applicant: RED HAT, INC., Raleigh, NC (US)

(72) Inventors: Jesper Brouer, Frederikssund (DK); Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 188 days.

(21) Appl. No.: 16/839,397

(22) Filed: Apr. 3, 2020

(65) Prior Publication Data

US 2021/0314281 A1   Oct. 7, 2021

(51) Int. Cl.
| | | |
|---|---|---|
| H04L 12/00 | (2006.01) | |
| H04L 49/90 | (2022.01) | |
| H04L 45/74 | (2022.01) | |
| G06F 12/0804 | (2016.01) | |
| H04L 69/22 | (2022.01) | |

(52) U.S. Cl.
CPC ...... *H04L 49/9073* (2013.01); *G06F 12/0804* (2013.01); *H04L 45/74* (2013.01); *H04L 69/22* (2013.01); *G06F 2212/154* (2013.01)

(58) Field of Classification Search
CPC .......... G06F 12/0804; G06F 2212/154; H04L 45/74; H04L 49/3009; H04L 49/9068; H04L 49/9073; H04L 69/22
See application file for complete search history.

(56) References Cited

U.S. PATENT DOCUMENTS

| | | | |
|---|---|---|---|
| 6,850,495 B1* | 2/2005 | Baum | H04L 12/4641 |
| | | | 370/256 |
| 8,185,653 B2 | 5/2012 | Yau et al. | |
| 9,240,939 B2 | 1/2016 | Nguyen et al. | |
| 9,553,892 B2 | 1/2017 | Kelson et al. | |
| 10,198,354 B2* | 2/2019 | Chen | G06F 12/0868 |
| 2008/0285565 A1* | 11/2008 | Gunther | H04L 51/063 |
| | | | 370/394 |
| 2019/0140983 A1* | 5/2019 | Tu | H04L 43/028 |
| 2020/0145376 A1* | 5/2020 | Pope | H04L 63/029 |

OTHER PUBLICATIONS

"Troubleshooting Input Queue Drops and Output Queue Drops", (May 3, 2016). Cisco, 11 pages.
"XDP Common Client Specification". ( Nov. 29, 2019). Intercontinental Exchange, Inc., 32 pages.
"Optimizing the Dispatcher cache". (Feb. 7, 2020). Adode, 7 pages.
"AF_XDP". The Kernel Development Community, 8 pages.

\* cited by examiner

*Primary Examiner* — Phuc H Tran
(74) *Attorney, Agent, or Firm* — Womble Bond Dickinson (US) LLP (57) ABSTRACT

A network packet is received from a network interface card (NIC). A determination is made, in view of a filter specifying handling of network packets, as to whether the network packet is to be modified. In response to determining that the network packet is to be modified, a portion of the network packet is modified in view of the filter. The modified portion of the network packet is provided to the NIC.

20 Claims, 6 Drawing Sheets

EFFICIENT PACKET RE-TRANSMISSION FOR EXPRESS DATA PATHS

TECHNICAL FIELD

Aspects of the present disclosure relate to a network architecture, and more particularly, to efficient packet retransmission for express data paths.

BACKGROUND

An express data path (XDP) is a way for an operating system (OS) to handle networking packets coming from a network interface card (MC). A hook is placed in the NIC driver after interrupt processing before any memory allocation from the network stack. A filter program is then used to decide how the network packet is to be handled.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

An express data path (XDP) is a way for an operating system (OS) of a host system to handle networking packets coming from a network interface card (NIC). With XDP, a filter program (also referred to as "filter" hereafter) is received by a supervisor or OS of a host system. The filter may be executed after the NIC has received a network packet (also referred to as "packet" hereafter) and stored the packet into the memory of the NIC. The filter can then examine the packet to determine how the packet is to be utilized/handled, make any necessary modifications to the packet, and transmit a command to the NIC based on how the packet is determined to be handled.

In embodiments, the command may cause the NIC to perform one or more actions with regards to the packet. In some embodiments, the command may cause the NIC to drop the packet (e.g., XDP_DROP). In an embodiment, the command may cause the packet to be passed to an application executed by the host system (e.g., XDP_PASS). In embodiments, the command may cause the packet to be re-transmitted out of the NIC (e.g., XDP_TX). In some embodiments, the command may cause the NIC to transmit the packet to another device (e.g., XDP_REDIRECT).

To ensure that a filter is safe to run on the packet, a verifier of the host system performs access bounds (also referred to as "bounds" hereafter) checks on the filter. Before a value (e.g., register) can be used as a pointer, the supervisor or OS of the host system processes the value and validates that the register value has been bounds checked. For example, if a register value is tested at <4096, the verifier concludes that the register value can be safely used to access packet data if a 4 kilobyte (KB) packet buffer has been allocated. If the register value cannot be safely used to access packet data, then the verifier may reject the filter.

When a packet is re-transmitted by a host system, the packet may be synchronized to a cache of a processing device of the host system to ensure the processing device of the host system is not accessing stale data. In conventional systems, the processing device may modify the packet and the packet data in the cache is automatically synchronized to the NIC. However, in Advanced RISC Machines (ARM) systems, the system may implement non-coherent direct-memory access (DMA) devices. In such systems, each time a packet is modified by the processing device for re-transmission, the entirety of the modified packet is flushed from the cache of the processing device to a network interface card (NIC) of the host system for subsequent transmission.

Flushing the entire packet from the cache can increase the amount of time required for the host system to re-transmit network packets from the host system. For example, the time required to flush the entire packet from the cache of the processing device to the NIC may result in a 25% slowdown of the re-transmission of packets by the host system.

Aspects of the disclosure address the above-noted and other deficiencies by flushing a portion of the network packet from the cache to the NIC. Upon receiving an incoming packet, the NIC may synchronize the packet to the cache of the processing device. The processing device may then execute a filter to determine how the packet is to be handled. For example, the filter may indicate that a packet is to be dropped, passed to an application, re-transmitted, or redirected to another device. The filter may also indicate whether the packet is to be modified by the processing device. For example, the filter may indicate that the processing device is to modify the header of the packet as part of a re-transmission operation.

If the filter indicates that the packet is to be modified, the processing logic may modify the packet stored in the cache as indicated by the filter. Upon completing the modification, the portion of the packet that has been modified may be flushed from the cache to a memory of the NIC of the host system, rather than the entire packet. For example, if the processing logic modified the header of a packet, then the portion of the network packet containing the header may be flushed from the cache to the memory of the NIC.

By flushing a portion of a packet to from the cache to the memory of the NIC rather than the entire packet, the amount of data being flushed from the cache to the memory is reduced. This improves the performance of the host system by enabling the host system to more quickly and efficiently process and re-transmit packets.

Figure 1:
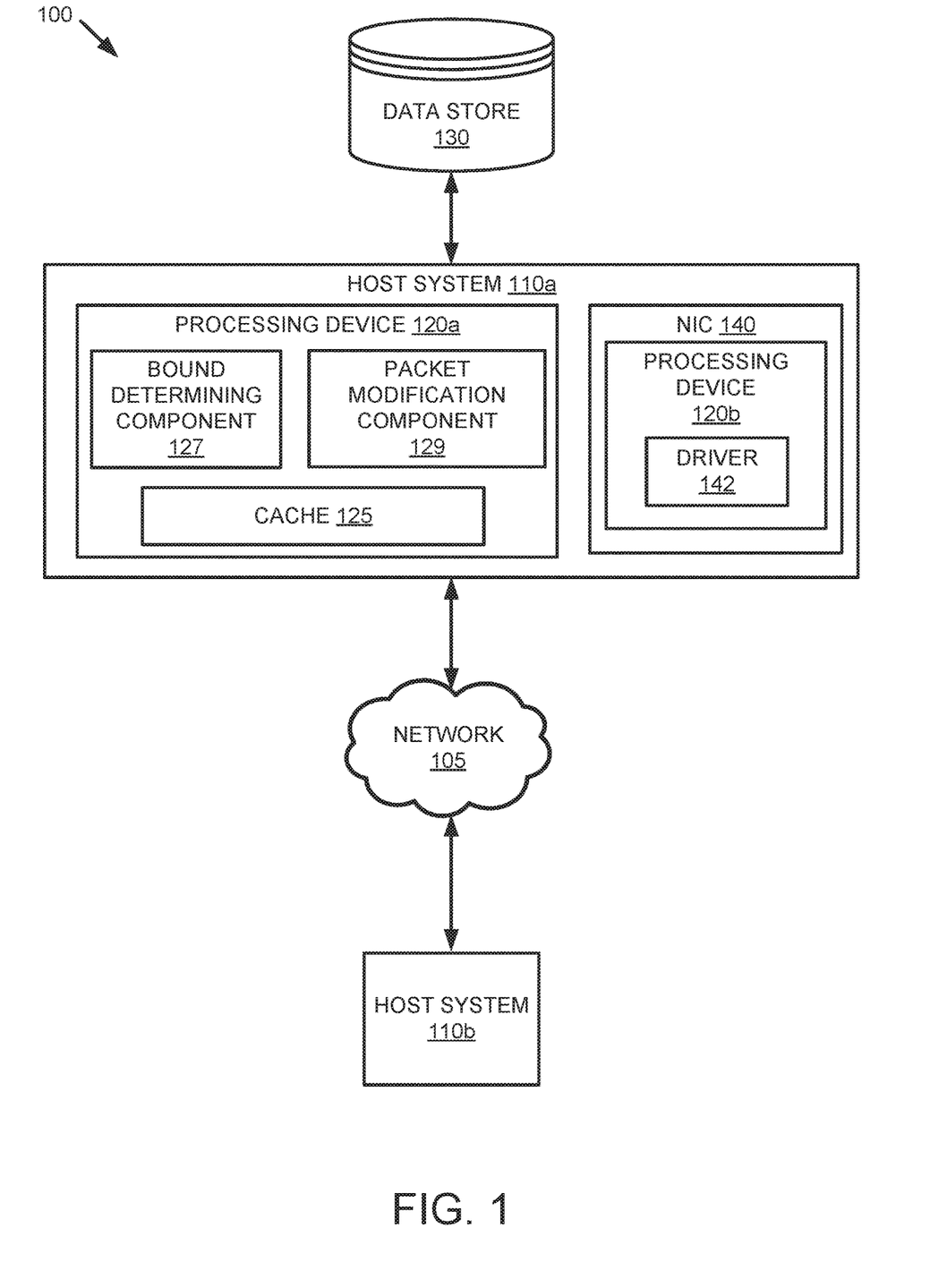
FIG. 1 is a block diagram that illustrates an example data center, in accordance with some embodiments.

FIG. 1 is a block diagram that illustrates an example computer architecture 100, in accordance with some embodiments of the present disclosure. The computer architecture 100 may include host systems 110a, b.

As illustrated in FIG. 1, computer architecture 100 includes host systems 110a, b that include one or more computing processing devices 120a, data store 130, and network interface controller (NIC) 140. For clarity, a processing device and data store for host system 110b are not shown. The host systems 110a, b are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi' hotspot connected with the network 105 and/or a wireless carrier system that can be implemented using various data processing equipment, communication towers (e.g. cell towers), etc. The network 105 may carry communications (e.g., data, message, packets, frames, etc.) between the various components of host systems 110a, b.

The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. In embodiments, data store 130 may include one or more direct-memory access (DMA) devices.

The NIC 140 may connect host system 110a to network 105 and send/receive communications for the host system 110a via the network 105. The NIC 140 includes one or more computing processing devices 120b that execute a driver 142. The driver 142 may control operations performed by NIC 140 and enable communication between the NIC 140 and the OS of host system 110a. The NIC 140 may send and receive packets 144 to and from host system 110a via the network 105.

Each component may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The host systems 110a, b may include any suitable type of computing device or machine that has a programmable processor including, for example, server computers, desktop computers, laptop computers, tablet computers, smartphones, set-top boxes, etc. In some examples, host systems 110a, b may comprise a single machine or may include multiple interconnected machines (e.g., multiple servers configured in a cluster). Host systems 110a, b may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

Processing device 120a of host system 110a may include a cache 125 to store data that is to be accessed by processing device 120a. In embodiments, the cache 125 may be a random-access memory, such as dynamic random-access memory (DRAM). In embodiments, processing device 120a may implement an Advanced RISC Machines (ARM) architecture.

In embodiments, processing device 120a may execute a bound determining component 127. In embodiments, the bound determining component 127 may include a verifier that performs a bounds check on a filter to be used for XDP. The bound determining component 127 may determine a set of access bounds for the filter that specifies how received network packets are to be handled. The bound determining component 127 may further determine a maximum access bound for one or more register values of the filter. The bound determining component 127 may also provide the set of access bounds and/or a maximum access bound to driver 142 of NIC 140.

In embodiments, processing device 120a may execute a packet modification component 129. The packet modification component 129 may modify a portion of a network packet received from the NIC 140 stored at the cache 125 of the processing device 120a. Upon modifying the packet, the packet modification component 129 may flush the modified portion of the packet from the cache 125 to a memory (not shown) of the NIC 140. Further details regarding bound determining component 127 and packet modification component 129 will be discussed at FIGS. 2-6 below.

Figure 2:
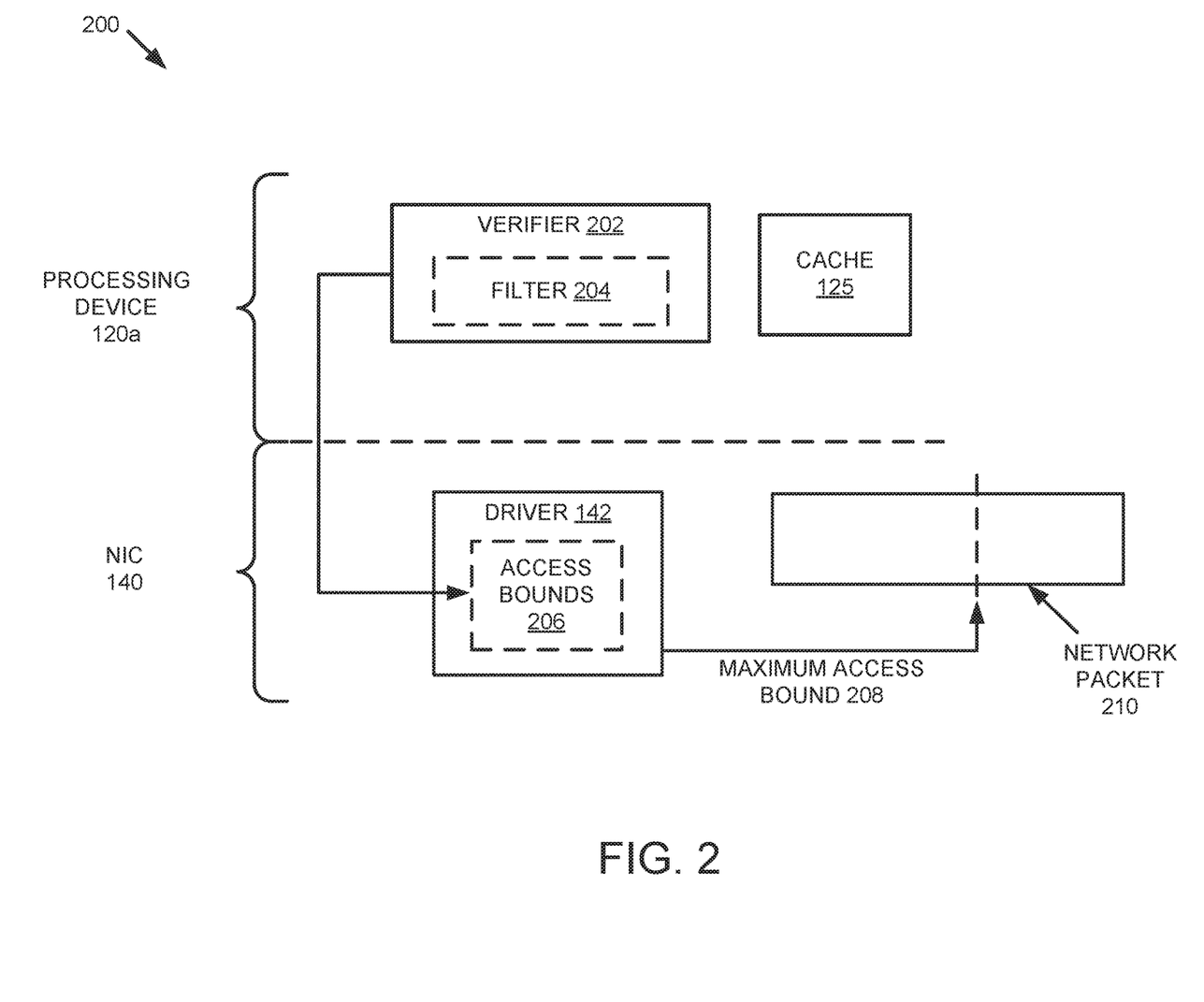
FIG. 2 is an illustration of an example of a verifier providing a set of access bounds to a network interface card (NIC) in accordance with embodiments of the disclosure.

FIG. 2 is an illustration 200 of an example of a verifier providing a set of access bounds to a NIC in accordance with embodiments of the disclosure. The top portion of illustration 200 may include software and/or hardware components of processing device 120a, while the bottom portion of illustration 200 may include software and/or hardware components of NIC 140.

Processing device 120a may include a verifier 202, a filter 204 and a cache 125. As previously described, the filter 204 may be executed by processing device 120a to determine how a network packet 210 is to be utilized/handled, make any necessary modifications to the packet, and transmit a command to NIC 140 based on how the packet is determined to be handled. For example, the filter 204 may transmit a command to NIC 140 to cause the NIC 140 to drop a packet, pass the packet to an application executed by processing device 120a, re-transmit the packet out of NIC 140, or transmit the packet to another device.

Verifier 202 may perform an access bounds check on filter 204 to determine whether filter 204 is safe to run on a packet received by NIC 140, as previously described. In some embodiments, when the verifier 202 performs the bounds check on filter 204, the verifier 202 may also determine access bounds 206 for the filter 204. In an embodiment, the access bounds 206 may correspond to safe bounds for each register value used to access data from a packet received by NIC 140. In embodiments, the access bounds 206 correspond to a maximum bound from the safe bounds for one or more of the register values.

In some embodiments, upon determining the access bounds 206, the verifier 202 may provide the access bounds 206 to a driver 142 of the NIC 140. In embodiments, the access bounds 206 may be transmitted to the driver 142 before packets are received by NIC 140. For example, the access bounds 206 may be transmitted to the driver 142 of NIC 140 during a system setup. In an embodiment, upon receiving a network packet 210, the driver 142 of NIC 140 may identify a maximum access bound 208 from the access bounds 206 previously received from verifier 202.

Figure 3:
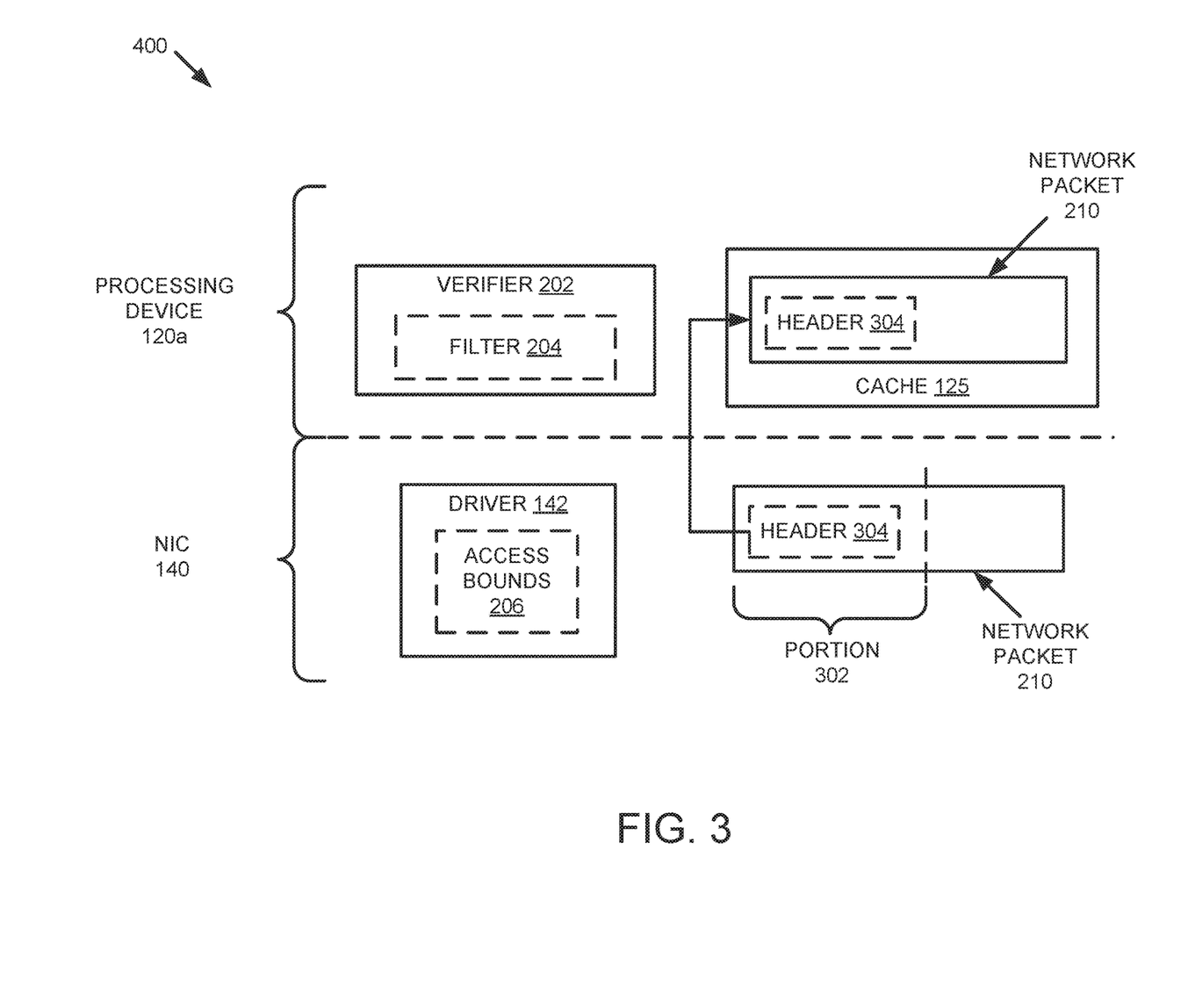
FIG. 3 is an illustration of an example of a NIC synchronizing a received network packet to a cache of a processing device in accordance with embodiments of the disclosure.

FIG. 3 is an illustration 300 of an example of a NIC synchronizing a received network packet to a cache of a processing device in accordance with embodiments of the disclosure. In illustration 300, a network packet 210 has been received by NIC 140 via a network (e.g., network 105 of FIG. 1). The network packet 210 may include a header 304 that includes information (e.g., IP addresses, protocols, etc.) used by filter 204 to determine how network packet 210 is to be handled, as will be described in further detail below.

In some embodiments, the NIC 140 may synchronize the entirety of network packet 210 to the cache 125 of the processing device 120a. Upon synchronizing the network packet 210, the processing device 120a may execute filter 204 to determine how the network packet is to be handled. Information associated with network packet 210 may be read from the header 304 and used by the filter 204 to determine how the network packet 210 is to be handled. For example, the filter 204 may use the information included in the header 304 to determine that the network packet 210 is to be modified and re-transmitted from the host system.

In embodiments, the NIC 140 may synchronize a portion 302 of the network packet 210 to the cache of the processing device 120a rather than the entirety of the network packet 210. In some embodiments, the portion 302 of the network packet 210 synchronized to the cache 125 may include the header 304 and/or may correspond to the maximum access bound (e.g., maximum access bound 208 of FIG. 2) of the access bounds 206. For example, if the maximum access bound 208 has a value of 4 KB, then the portion 302 of the network packet 210 synchronized to the cache 125 may correspond to a 4 KB portion of the network packet 210.

Figure 4:
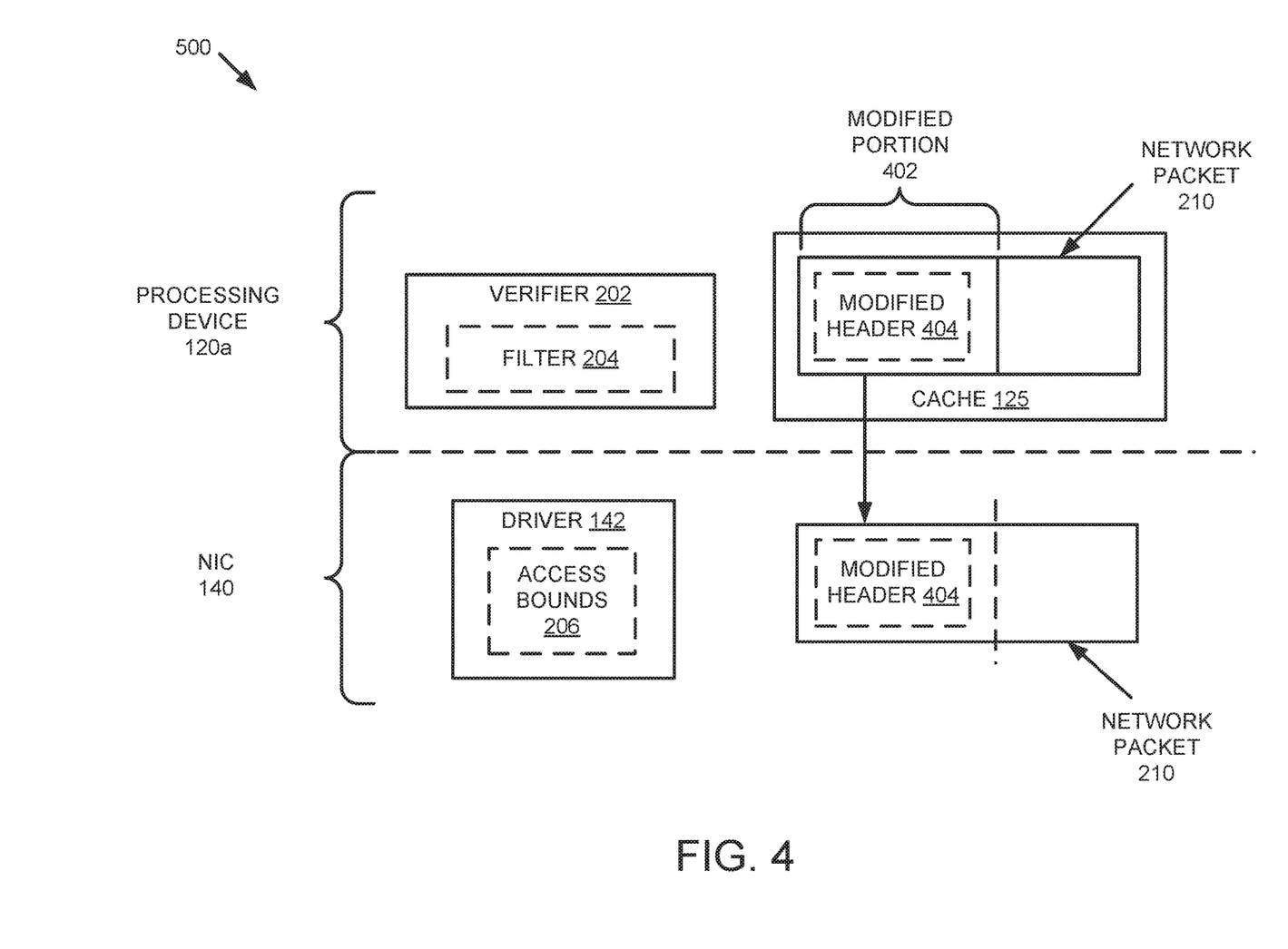
FIG. 4 is an illustration of an example of a processing device flushing a portion of a network packet to a NIC in accordance with embodiments of the disclosure.

FIG. 4 is an illustration 400 of an example of a processing device flushing a portion of a network packet to a NIC in accordance with embodiments of the disclosure. In FIG. 4, upon executing filter 204, the processing device 120a has determined that network packet 210 is to be modified and re-transmitted from the host system. For example, the filter 204 may indicate that the processing device 120a is to modify the header (e.g., header 304 of FIG. 3) of network packet 210, then re-transmit the network packet 210 to another device/host system.

Upon determining that the network packet 210 is to be modified, the processing device may modify the header of the network packet 210 to generate a modified header 404. The processing device may then flush a modified portion 402 of the network packet 210 that includes the modifications made by the processing device 120a (e.g., the modified header 404) from the cache 125 to a memory (not shown) of the NIC 140. In embodiments, the processing device 120a may transmit a command to NIC 140 to cause the NIC 140 to transmit the network packet 210 including the modified header 404 to another device/host system via a network. Upon receipt of the modified portion 402, the NIC 140 may combine the modified portion 402 with the remaining, unmodified portion of network packet 210. The network packet 210 may then be transmitted to the other device/host system via the network.

Figure 5:
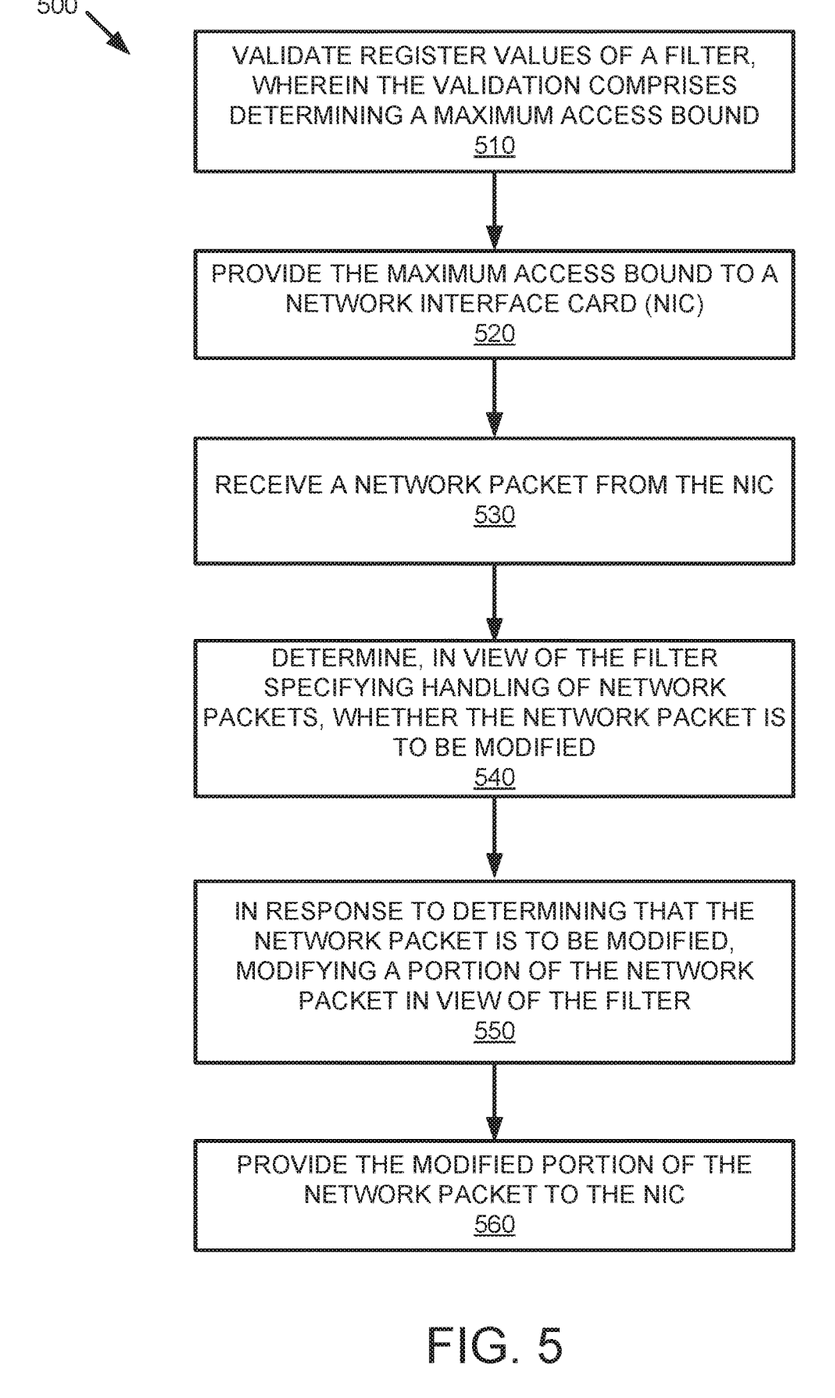
FIG. 5 is a flow diagram of a method of flushing a modified portion of a network packet to a NIC, in accordance with some embodiments.

FIG. 5 is a flow diagram of a method 500 of flushing a modified portion of a network packet to a NIC, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by bound determining component 127 and/or packet modification component 129 of FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic validates register values of a filter. While validating the register values of the filter, the processing logic may determine a maximum access bound of the filter, as previously described.

At block 520, the processing logic provides the maximum access bound to a network interface card (NIC).

At block 530, the processing logic receives a network packet from the NIC. In embodiments, the NIC may synchronize all or a portion of the network packet to a cache that is accessible to the processing logic, as previously described.

At block 540, the processing logic determines, in view of the filter specifying handling of network packets, whether the network packet is to be modified. In some embodiments, the filter may indicate that a network packet is to be modified as part of a packet re-transmission process. For example, the filter may indicate that a header of the network packet is to be modified, then the packet is to be re-transmitted to another device/host system.

At block 550, in response to determining that the network packet is to be modified, the processing logic modifies a portion of the network packet in view of the filter. For example, if the filter indicates that the header of the network packet is to be modified, then the processing logic may modify a portion of the network packet that includes the header.

At block 560, the processing logic provides the modified portion of the network packet to the NIC. In some embodiments, the processing logic may provide the modified portion of the network packet to the NIC by flushing the modified portion of the packet from the cache of a processing device to a memory of the NIC, as previously described. In embodiments, other processes may be used to provide the modified portion of the network packet to the NIC.

Although embodiments of the disclosure describe a network packet being provided from a processing device to a NIC of a host system, such embodiments are shown for illustrative purposes only. Aspects of the disclosure may be utilized by a processing device to provide a modified portion of data to any type of a device of a host system.

Figure 6:
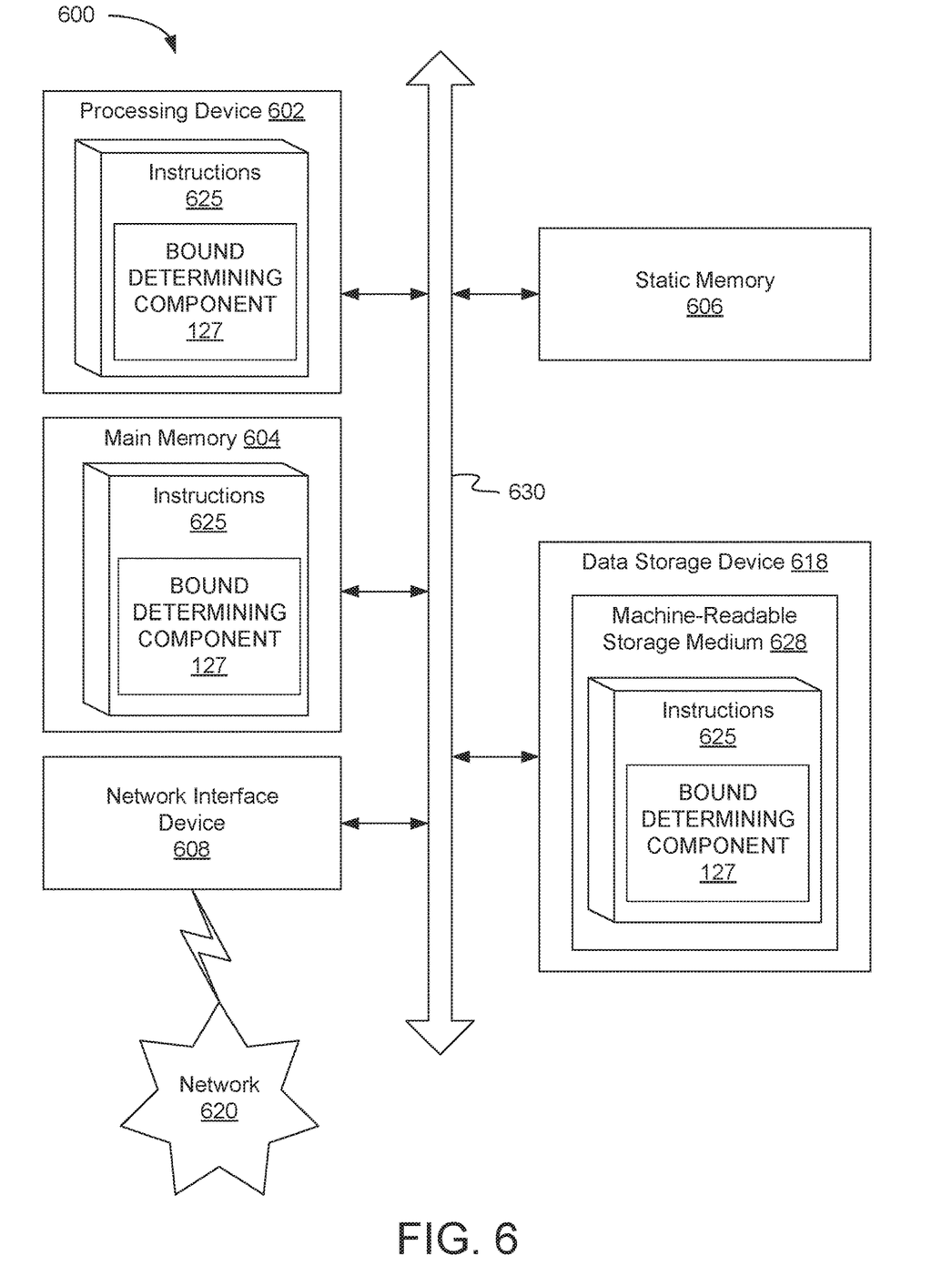
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a bound determining component and/or a partial synchronization component, e.g., bound determining component 127 and/or packet modification component 129 for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    validating register values of a filter, wherein the validation comprises determining an access bound of the filter;
    providing the access bound to a network interface card (NIC);
    receiving a network packet from the NIC;
    determining, in view of the filter specifying handling of network packets, whether the network packet is to be modified;
    in response to determining that the network packet is to be modified, modifying a portion of the network packet in view of the filter to generate a modified portion of the network packet; and
    providing, by a processing device, the modified portion of the network packet to the NIC.

2. The method of claim 1, wherein the modified portion of the network packet comprises a header of the network packet.

3. The method of claim 1, wherein providing the modified portion of the network packet to the NIC causes the NIC to transmit the network packet comprising the modified portion via a network.

4. The method of claim 1, wherein the processing device is operatively coupled to one or more non-coherent direct-memory access devices.

5. The method of claim 1, wherein providing the access bound to the NIC causes the NIC to synchronize a second portion of network packets received by the NIC to the processing device, wherein the second portion corresponds to the access bound.

6. The method of claim 1, wherein the modified portion of the network packet corresponds to the access bound.

7. The method of claim 1, wherein providing the modified portion of the network packet to the NIC further comprises:
    flushing the modified portion of the network packet from a cache operatively coupled to the processing device to the NIC.

8. A system comprising:
    a memory; and
    a processing device, operatively coupled to the memory, to:
        validate register values of a filter, wherein the validation comprises determining an access bound of the filter;
        provide the access bound to a network interface card (NIC);
        receive a network packet from the NIC;
        determine, in view of the filter specifying handling of network packets, whether the network packet is to be modified;
        in response to determining that the network packet is to be modified, modify a portion of the network packet in view of the filter to generate a modified portion of the network packet; and
        provide the modified portion of the network packet to the NIC.

9. The system of claim 8, wherein the modified portion of the network packet comprises a header of the network packet.

10. The system of claim 8, wherein synchronizing the modified portion of the network packet to the NIC causes the NIC to transmit the network packet comprising the modified portion via a network.

11. The system of claim 8, wherein the processing device is operatively coupled to one or more non-coherent direct-memory access devices.

12. The system of claim 8, wherein providing the access bound to the NIC causes the NIC to synchronize a second portion of network packets received by the NIC to the processing device, wherein the second portion corresponds to the access bound.

13. The system of claim 8, wherein the modified portion of the network packet corresponds to the access bound.

14. The system of claim 8, wherein to provide the modified portion of the network packet to the NIC, the processing device is further to:
    flush the modified portion of the network packet from a cache operatively coupled to the processing device to the NIC.

15. A non-transitory computer-readable storage medium including instructions that, when executed by a processing device, cause the processing device to:
    validate register values of a filter, wherein the validation comprises determining an access bound of the filter;
    provide the access bound to a network interface card (NIC);
    receive a network packet from the NIC;
    determine, in view of the filter specifying handling of network packets, whether the network packet is to be modified;
    in response to determining that the network packet is to be modified, modify a portion of the network packet in view of the filter to generate a modified portion of the network packet; and
    provide, by the processing device, the modified portion of the network packet to the NIC.

16. The non-transitory computer-readable storage medium of claim 15, wherein the modified portion of the network packet comprises a header of the network packet.

17. The non-transitory computer-readable storage medium of claim 15, wherein synchronizing the modified portion of the network packet to the NIC causes the NIC to transmit the network packet comprising the modified portion via a network.

18. The non-transitory computer-readable storage medium of claim 15, wherein the processing device is operatively coupled to one or more non-coherent direct-memory access devices.

19. The non-transitory computer-readable storage medium of claim 15, wherein providing the access bound to the NIC causes the NIC to synchronize a second portion of network packets received by the NIC to the processing device, wherein the second portion corresponds to the access bound.

20. The non-transitory computer-readable storage medium of claim 15, wherein the modified portion of the network packet corresponds to the access bound.

* * * * *